(12) United States Patent
Oltman et al.

(10) Patent No.: US 8,312,889 B2
(45) Date of Patent: Nov. 20, 2012

(54) COMBINATION FLOW CONTROL VALVE AND REVERSE FLOW CHECK VALVE

(75) Inventors: Darrell A. Oltman, Lincoln, NE (US); Larry D. Thomas, Beatrice, NE (US); Thomas P. O'Connell, Lincoln, NE (US)

(73) Assignee: Snyder Industries, Inc., Lincoln, NE (US)

( * ) Notice: Subject to any disclaimer, the term of this patent is extended or adjusted under 35 U.S.C. 154(b) by 283 days.

(21) Appl. No.: 12/795,507

(22) Filed: Jun. 7, 2010

(65) Prior Publication Data
US 2010/0326531 A1    Dec. 30, 2010

Related U.S. Application Data

(60) Provisional application No. 61/221,917, filed on Jun. 30, 2009.

(51) Int. Cl.
  *F16K 15/04*    (2006.01)
  *F16K 27/00*    (2006.01)
(52) U.S. Cl. . 137/1; 137/614.2; 137/519.5; 137/533.11; 137/590; 251/144
(58) Field of Classification Search ............... 137/614.2, 137/613, 1, 533.11, 519.5, 590, 592; 251/144
See application file for complete search history.

(56) References Cited

U.S. PATENT DOCUMENTS

| | | | |
|---|---|---|---|
| 4,372,343 A * | 2/1983 | Trinkwalder, Jr. | ......... 137/614.2 |
| 5,595,217 A | 1/1997 | Gillen et al. | |
| 5,673,896 A | 10/1997 | Gillen | |
| 5,988,699 A | 11/1999 | Quandt | |
| 6,050,545 A * | 4/2000 | Stolzman | ....................... 251/144 |
| 6,056,012 A * | 5/2000 | Yuen et al. | .................. 137/614.2 |
| 6,499,721 B2 * | 12/2002 | Stolzman et al. | ............. 251/144 |
| 6,550,495 B1 * | 4/2003 | Schulze | ...................... 137/614.2 |
| 6,619,316 B2 * | 9/2003 | Wiechers et al. | ......... 137/533.11 |
| 6,945,273 B2 | 9/2005 | Reid | |

(Continued)

OTHER PUBLICATIONS

Photograph of Murray Equipment Inc. Check Valve Unit attached to Banjo flow control valve, produced from about 1999 and conceded to be prior art.

(Continued)

*Primary Examiner* — Kevin Lee
(74) *Attorney, Agent, or Firm* — Hovey Williams LLP

(57) ABSTRACT

A combination flow control and reverse flow check valve provides a compact valve unit for controlling the flow of fluid in a downstream direction and limiting undesired backflow of liquid into a source such as a reservoir. The flow control and reverse flow check valve may be provided as a unitary member having a housing with an upstream end configured for mounting to the liquid source, a fluid conveying channel within the housing, and a check element positioned in the channel between the flow control valve, such as a ball valve, and a seat which is complementally configured with the check element to normally seal against backflow. A blocking element may be provided to prevent interference of the check element with the operation of the flow control valve while permitting liquid to flow in an intended downstream direction. Because the occurrence of a backflow event is an undesired and infrequent event which may necessitate investigation, the check element may be sized and made of a material which will move past the seat during pressurized flow, thereby providing an indicator that a backflow event has occurred when the check element is found within the source.

25 Claims, 8 Drawing Sheets

U.S. PATENT DOCUMENTS 6,971,633 B2    12/2005  Gillen
7,743,786 B2 *   6/2010  Madama et al. ......... 137/533.11

OTHER PUBLICATIONS

Photo of opening of Banjo flow control valve adapted to receive Murray Equipment Inc. check valve and showing longitudinal and circumferential machined grooves for receiving pin of Murray Equipment Inc. check valve, and conceded to be prior art, Dec. 1999.

Photo of outlet end of Murray Euipment Inc. check valve assembled as a unit and conceded to be prior art, Dec. 1999.

Photo of inlet end of Murray Equipment Inc. check valve assembled as a unit showing stainless steel pin for receipt in grooves of Banjo flow control valve, and conceded to be prior art, Dec. 1999.

Photo of Murray Equipment Inc. check valve positioned in front of Banjo flow control valve prior to insertion and final assembly, Dec. 1999.

* cited by examiner

COMBINATION FLOW CONTROL VALVE AND REVERSE FLOW CHECK VALVE

BACKGROUND OF THE INVENTION

1. Field of the Invention

The present invention concerns valves used for controlling the flow of liquid from a vessel, through a pipe, or to a receptacle. More particularly, it is concerned with a valve which is of compact construction capable of both controlling the flow of liquid through the valve and for preventing backflow of liquid through the valve.

2. Description of the Prior Art

Liquid handling systems include pipelines, fluid storage vessels such as intermediate bulk containers (IBC's) and the like and are typically provided with valves which are used to control the flow through the system. Those valves may be gate valves, ball valves or other types of controllable valves whereby an operator may regulate the flow of liquid through the system.

In many such systems, the valves must be placed in confined locations which limit the size and configuration of the valve. In some instances, such as sanitary systems or in chemical applications where some chemicals may be reactive with others, it is necessary to avoid reverse flow of the liquid. That is, it may be desirable or essential that the liquid flow in one direction only. Furthermore, any connection of components within the liquid handling system presents a potential for leaks, whereby liquid may leak from a valve, pipe or fitting. There has thus developed a need for a compact valve which meets these demands.

SUMMARY OF THE INVENTION

These and other objects have largely been met by the combination flow control valve and reverse flow check valve of the present invention. That is to say, the valve of the present invention provides a unique, compact solution where size restrictions or considerations of leakage, contamination or cost would not permit or recommend the use of separate valves.

Broadly speaking, the combination flow control valve and reverse flow check valve of the present invention includes a housing defining a central, liquid conveying channel therethrough, a shiftable valve element positioned within the housing for controlling the flow of liquid through the channel, and a check element positioned within the housing in an upstream position relative to the desired direction of flow for preventing backflow of liquid through the channel. In addition, a blocking element is preferably provided to extend into the channel and prevent excessive downstream movement of the check element.

In the present invention, the shiftable valve element is preferably provided as a ball valve which is connected to a handle or other actuating member by a stem. The housing is most preferably configured as a bolted housing, whereby the ball valve is positioned within the housing and seals are provided between the ball valve and the housing to limit leakage therepast. The housing presents a first upstream end configured for coupling to a source of liquid, and a second downstream end which may include a spout or be configured for coupling to a further pipe or receptacle. The check element is most preferably a ball having an outer diameter greater than the internal dimension of the upstream end to prevent escape and to permit sealing thereagainst, but less than the internal dimension of that portion of the channel into which it is received so that liquid may flow therearound.

The combination valve hereof serves to permit selective control of the liquid flowing therethrough in a downstream direction. To restrict or stop such flow, the shiftable valve element is moved to partially or fully close the channel. However, when the shiftable valve element is in a position to at least partially permit channel of liquid through the combination valve, there may be occasions where reverse flow could be encountered. In this instance, the reverse flow of the liquid within the channel causes the check element to seal against the first upstream end of the valve housing, and thereby prevent escape of liquid in an undesired direction through the valve.

As a result, the combination valve hereof is beneficially designed to selectively permit the flow of liquid therethrough in a downstream direction, but prevents or at least inhibits the flow of liquid in an upstream direction out of the valve, thereby confining liquid within the valve. In addition, employment of the blocking element prevents the check element from blocking the channel during normal flow of liquid from the upstream to downstream direction.

These and other advantages will be readily apparent to those skilled in the art with reference to the drawings and detailed description thereof.

DESCRIPTION OF THE PREFERRED EMBODIMENT

Figure 1:
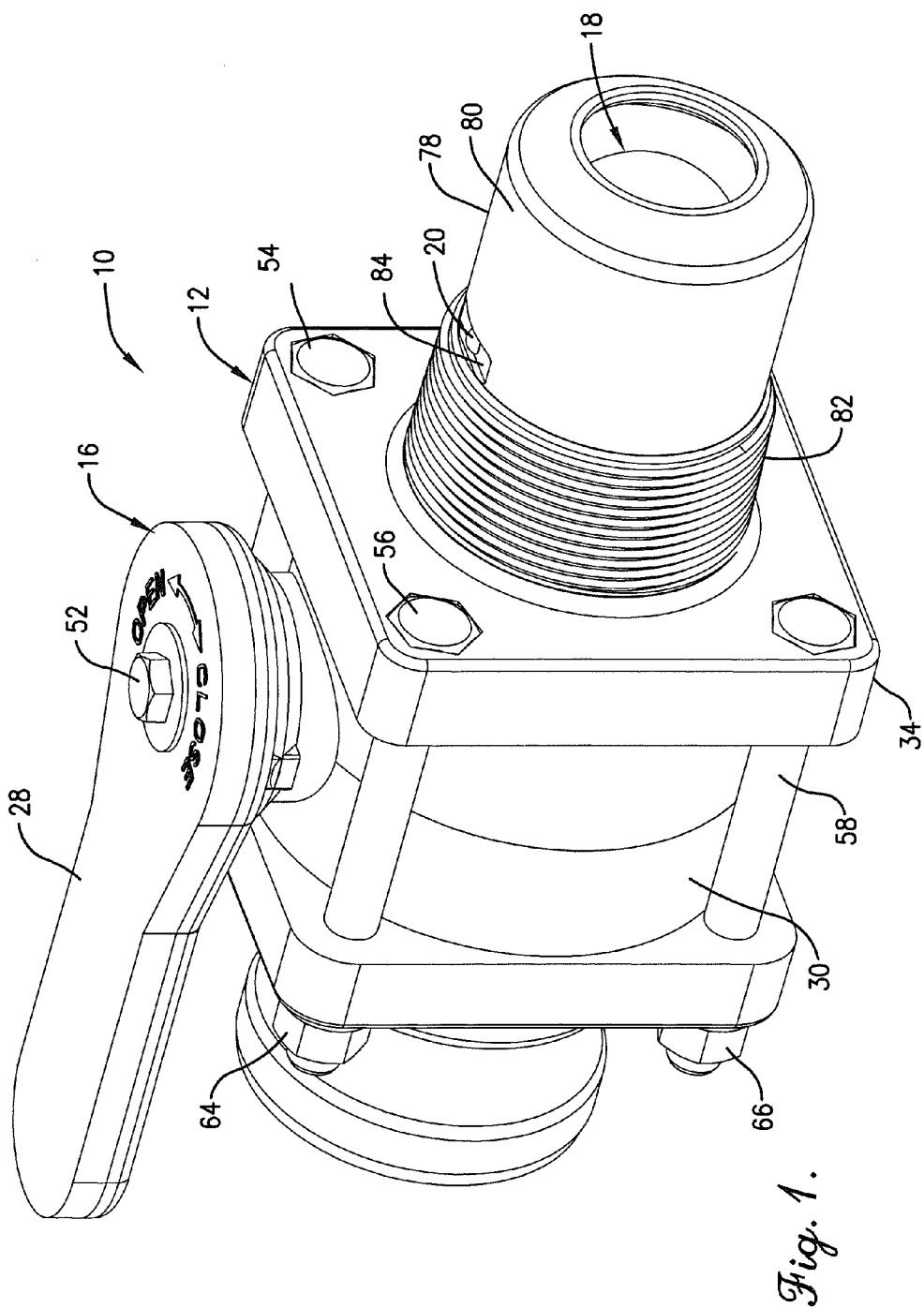
FIG. 1 is a top front isometric view of a combination flow control valve and reverse flow check valve in accordance with the present invention, showing a handle operatively connected to a flow control valve in an open position, and with a check element visible in through the opening in the first upstream end of the housing.

Referring now to the drawing, a combination flow control valve and reverse flow check valve 10 broadly includes a housing 12 defining a central, fluid conveying channel 14 extending longitudinally therethrough and having a central axis A, a flow control valve 16 positioned in the housing 12, a check element 18 positioned in the channel 14 of the housing 12, and a blocking element 20 positioned to inhibit excessive downstream movement of the check element 18 along the channel 14. The flow control valve 16 may be shiftable between open and closed positions, as well as partially open positions, and is shown and most preferably configured as a ball valve 22 having a generally spherical outer surface with a generally cylindrical bore 24 therethrough, although it will be appreciated that the present invention is also effective when other flow control valves, such as for example gate valves, globe valves and butterfly valves may also be used as flow control valves in the present invention. The ball valve 22 is adapted to mount a stem 26 which extends through the housing 12 and receives thereon a handle 28 for rotatably shifting the ball valve 22 within the housing 12 so that the bore 24 may be positioned in alignment and fluid communication with the channel 14, may be turned to position the bore 24 so that the housing 12 partially or completely blocks the flow of liquid through the valve 10.

Figure 2:
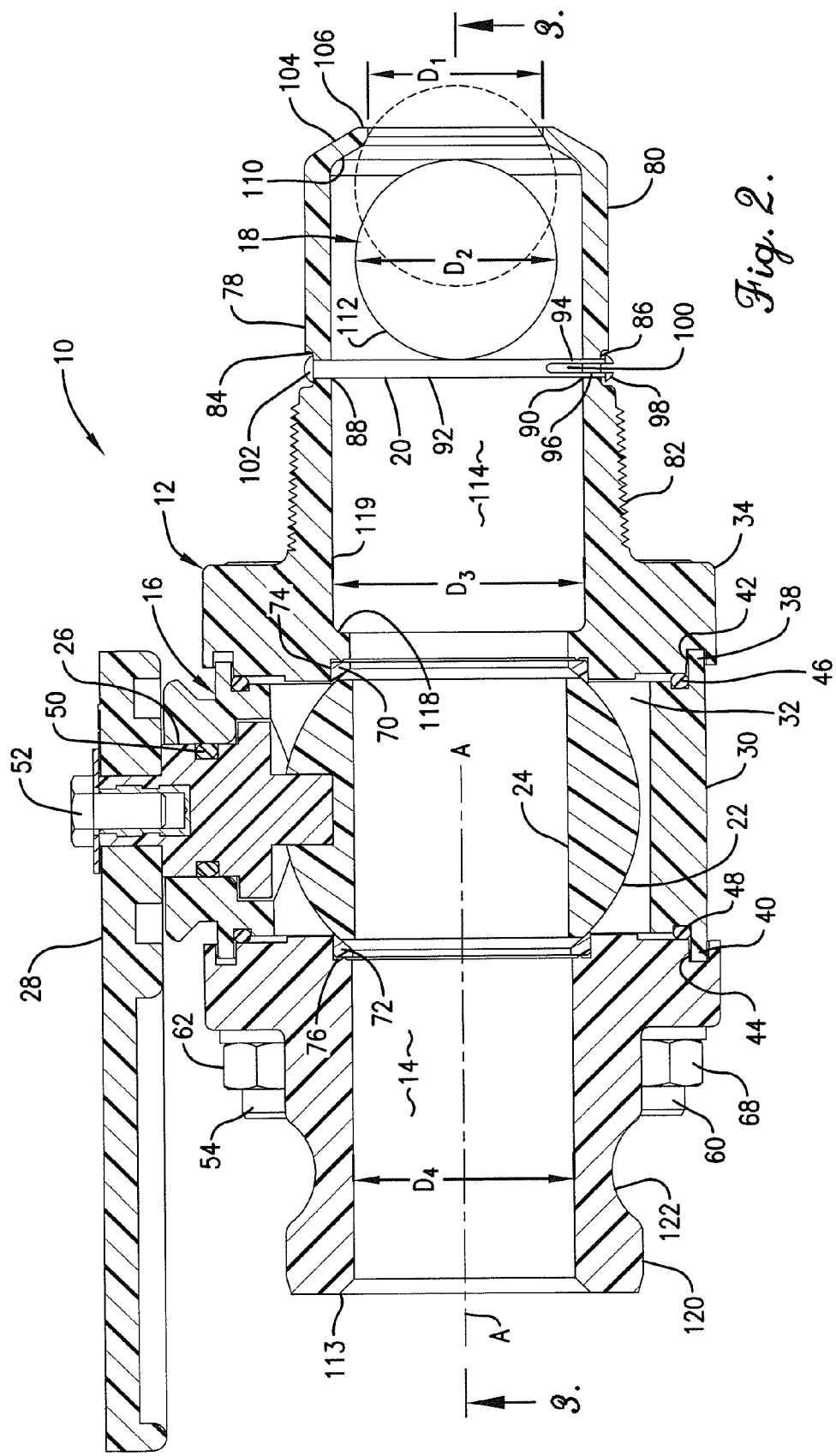
FIG. 2 is a vertical cross-sectional view showing the flow control valve as a ball valve and the check element as a ball positioned within the channel, its downstream movement limited by the blocking element.

In greater detail, the housing 12 hereof is shown with a central body 30 which is typically provided in two halves, receives the ball valve 22 in a chamber 32 thereof, a first upstream end body 34, and a second downstream end body 36. The central body 30 is provided with circular, longitudinally extending flanges 38 and 40 which are received in corresponding circular grooves 42 and 44 of the first upstream end body 34 and the second downstream end body 36. O-rings 46 and 48 help seal the valve against leakage. Stem 26 extends through the central body 30 in a direction generally perpendicular to the longitudinal axis of the channel 14 so that the ball valve 22 may rotate about an axis perpendicular to the longitudinal axis of the channel. An O ring 50 helps to seal the valve stem 26 and the central body 30. An interior, portion of the stem 26 is received in a recess or socket of the ball valve 22 as shown in FIG. 2 to engage and rotate the ball valve 22 within the chamber 22. Handle 28 is coupled by a bolt 52 or other fastener threadably attached to the valve stem 26 for applying a rotational force to the valve stem to turn (typically a ¼ turn) the ball valve 22 within the central body 30.

The first upstream end body 34, the central body 30, and the second downstream end body 36 are held together by four bolts 54, 56, 68 and 60, and secured by corresponding nuts 62, 64, 66 and 68. Seals 70 and 72 are received in recesses 74 and 76 for sealing the ball valve 22 against leakage. Tightening of the nuts onto their respective bolts provides the sealing engagement of the seals 70 and 72 with the ball valve 22.

The first upstream end body 34 includes as a unitary part thereof a tubular extension 78 having an outer surface 80 which is provided with a coupling structure 82, here shown as external threads. The outer surface 80 is further provided with a pair of diametrically opposed recesses 84 and 86. The recesses 84 and 86 present relieved areas having diametrically opposed and aligned holes 88 and 90 which permit insertion of blocking element 20 without the blocking element 20 obstructing the mounting of a conduit or the like to the tubular extension 78 and attachment to the coupling member 82. The blocking element 20 may be provided as a pin 92 which has a pair of prongs 94 and 96 each with an enlarged point 98 which is angled to facilitate insertion but resists unintended removal. A gap 100 lies between the prongs 94 and 96 whereby during insertion or removal of the pin 92, the prongs can be compressed together to pass through the holes 88 and 90. The height or extension of the points 98 and the length of the pin 92 is such that when the pin 92 is inserted through the holes 88 and 90, the points 98 do not extend beyond the recess 86. The pin 92 also includes an enlarged head 102 which has a transverse dimension greater than the distance across the hole 88 and which has a height less than the depth of the recess 84 such that when the pin 92 is inserted through the holes 88 and 90, the head 102 cannot pass through the hole 88 and does not extend above the recess 84 to interfere with mounting of conduit or the like onto the outer surface 80 of the tubular extension 78.

Figure 3:
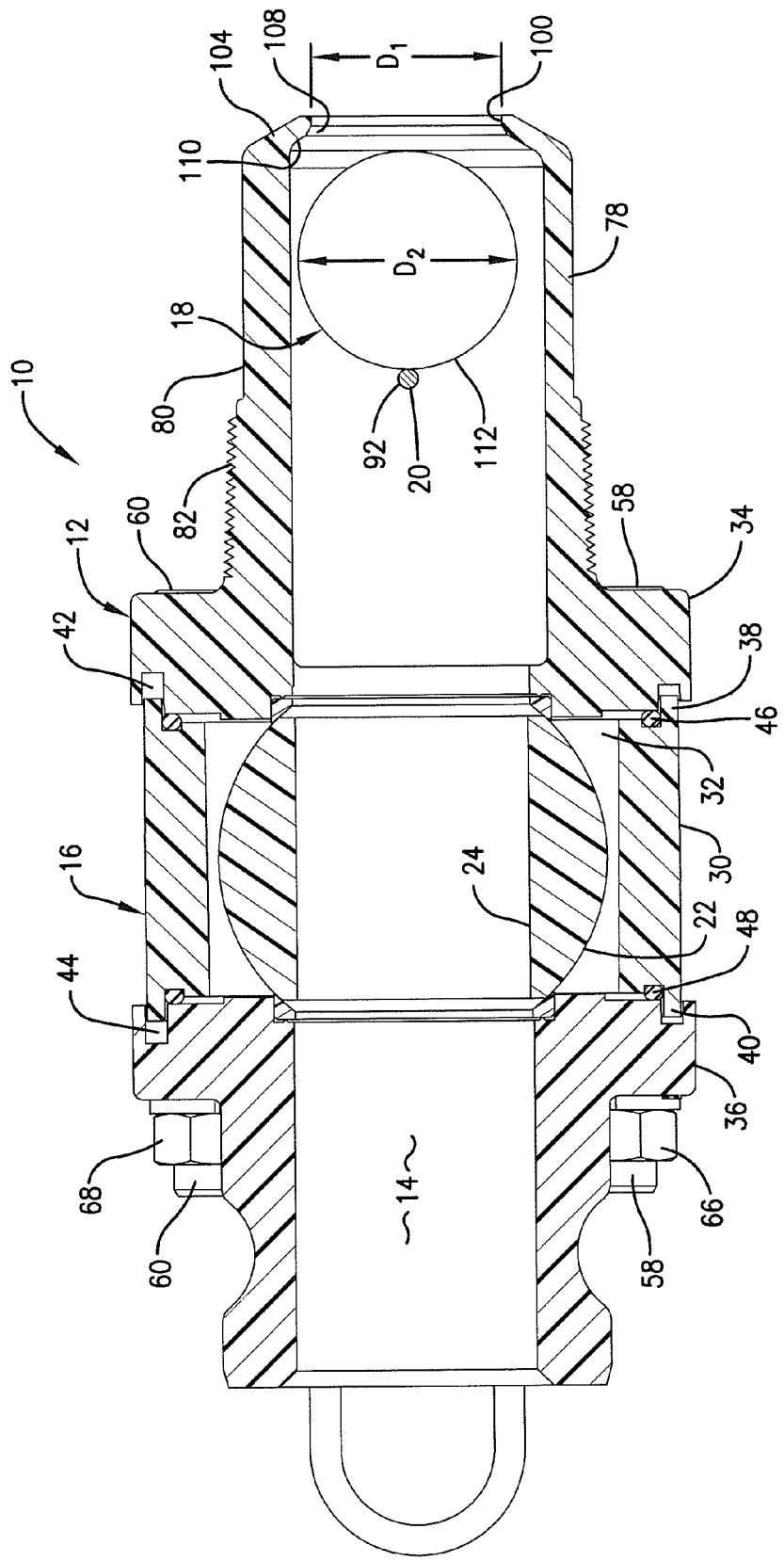
FIG. 3 is a horizontal cross-sectional view taken through the valve showing the ball valve in an open position and the check valve in an open position.

The tubular extension 78 of the first upstream end body 34 also includes an opening 106, and in the embodiment illustrated particularly in FIGS. 2 and 3, a circumferentially extending radially inwardly directed flange 104 defines the opening 106 for the desired entry of liquid into the valve 10. The flange 104 is angled in a direction generally toward the intended direction of liquid entry and away from the ball valve 22, and includes a substantially circular circumferentially extending angled seat 108 on its internal surface 110 adjacent opening 106. In the embodiment shown in FIGS. 2 and 3 when used as a reverse flow check valve, the seat 108 is preferably generally circular, such that dimension $D_1$ across the seat 108, at least at the area of smallest diameter, is substantially less than the transverse dimension $D_2$ (preferably a diameter) of the check element 18, which is preferably a sphere 112. The check element 18 is positioned within the housing in a desired upstream direction (desired flow being from the direction of the seat 108 toward the flow control valve 16 and thence downstream toward a downstream or outlet end 113) relative to the flow control valve 16 and thus in a desired upstream direction relative to the blocking element 20. The circumscribing seat 108 most preferably is oriented at an acute angle relative to a central axis A extending through the channel 14 and is complementally configured with the sphere 112 and faces in a slightly downstream direction in order to most effectively sealingly engage the sphere 112 during an episode of reverse flow. In this embodiment, the sphere 112 is thus prevented from escaping through the opening 106 during reverse flow, and seals against the seat 108. A portion of the channel 14 within the first upstream body 34 is a chamber 114 which has an inner surface 116 having an enlarged diameter $D_3$ relative to the diameter $D_4$ of the remainder of the channel 14 such that liquid may more readily flow around the sphere 112. The pin 92, when inserted, is positioned to extend diametrically across the chamber 114 and is located longitudinally intermediate the flange 104 and a circumferentially extending shoulder 118 which extends radially inwardly from the inner surface 119 of the chamber 114 and thereby provides for a reduced diameter for the remainder of the channel 14 normally downstream from the chamber 114. The chamber 114 is a part of channel 14, the remainder of the channel 14 having a diameter $D_4$ which diameter is generally consistent with that of the bore 24 to limit turbulence during flow of liquid through the valve 10. The diameter $D_4$ across the shoulder at its narrowest point is thus preferably the same as the diameter of the remainder of the channel 14 normally downstream from the shoulder 118, but the diameter across the shoulder 118 at its narrowest point is greater than the diameter $D_2$ of the sphere 112 to permit its insertion into the chamber 114, but less than the diameter $D_1$ across the seat 108. Also, the enlarged diameter $D_3$ is not so great that when the pin 92 is inserted across the chamber 114, the sphere 112 may escape past the pin 92 and enter the remainder of the channel 14 downstream from the chamber 114.

The second downstream end body 36 is positioned to be mated to the central body 30 on the normally downstream side of the central body 30 and the ball valve and thus opposite the first upstream end body 34. The second downstream end body 36 preferably has an outer surface 120 including a circumscribing groove 122 configured and adapted for enabling a coupler of a pipe, tank or other component of a fluid handling system to mount thereon. Other suitable fittings such as threaded attachments could be used instead of such a groove 122.

Figure 4:
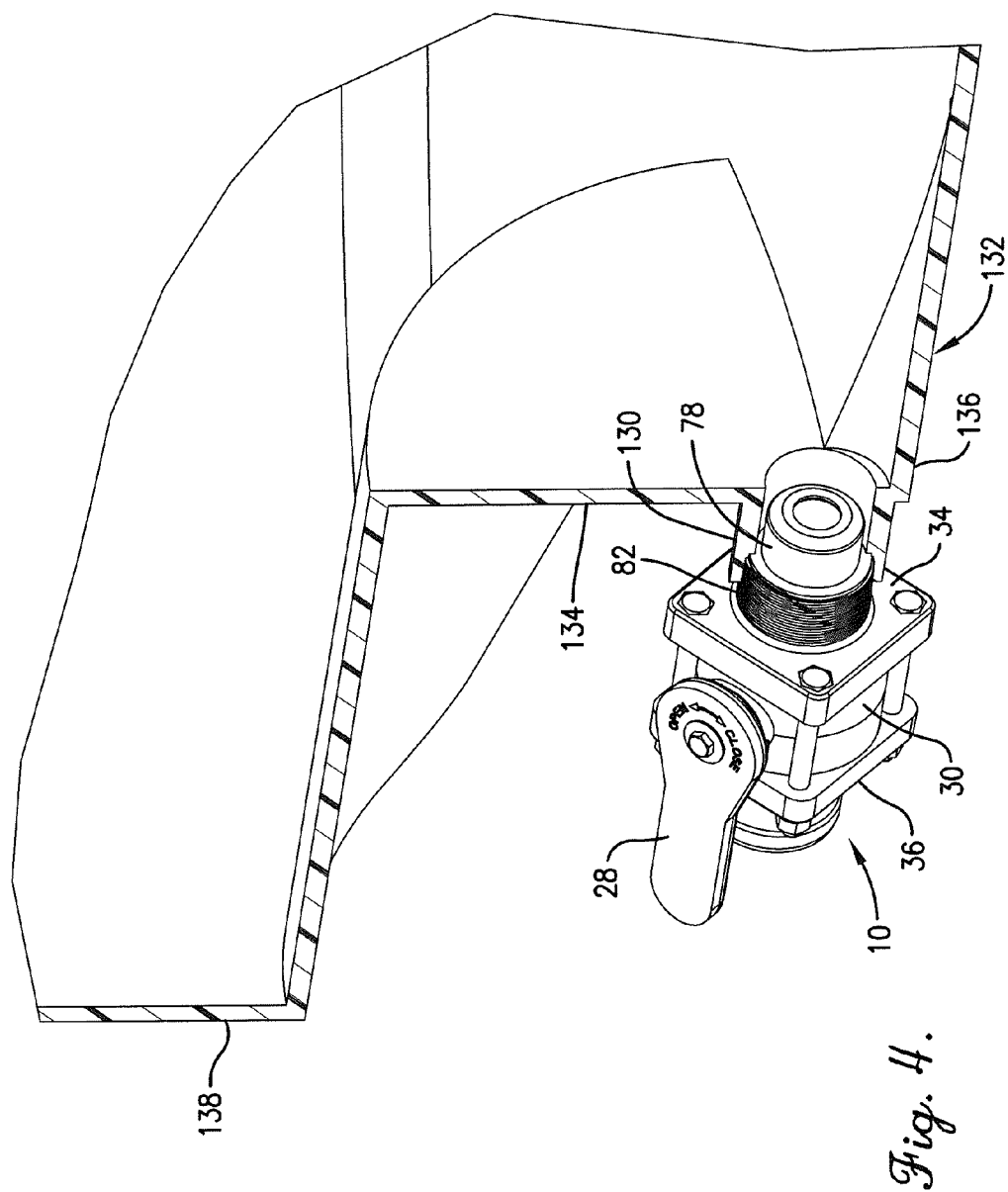
FIG. 4 is a fragmentary perspective view of the combination flow control valve and reverse flow check valve hereof shown mounted to a tubulation of a reservoir, the reservoir being shown in vertical cross-section through the tubulation.

FIG. 4 illustrates the combination flow control valve and reverse flow check valve 10 of FIGS. 1 through 3 mounted to a tubulation 130 of a reservoir 132, which may be of the types also known in the trade as a tank or container. The reservoir 132 is most advantageously rotationally molded of synthetic resin such as high density polyethylene (HDPE) and shown as an intermediate bulk container (IBC) but it may be appreciated that other materials and configurations of reservoirs 132 are within the scope of application of the present invention. As shown in FIG. 4, the tubulation 130 is shown as an integrally molded, unitary component near the bottom wall of the reservoir 132 for gravity drainage. Such reservoirs 132 also include a top wall having a fill access or opening near the top of the reservoir 132, so that filling of the liquid contents of the reservoir is to be accomplished through a different opening than the tubulation 130 which is used as a fluid outlet. The tubulation 130 typically extends somewhat from a side wall 134 of a bottom outlet plenum 136 so as to be laterally recessed with respect to the side wall 138 of the main part of the reservoir 132. The tubulation 130 is most preferably internally threaded at least along a part of its length so as to threadably receive the threads of the coupling structure 82 or be otherwise complementarily configured to mount the tubular extension 78 within the tubulation 130. It is thus desirable that when the combination flow control valve and reverse flow check valve 10 is mounted to the tubulation 130, the valve 10 is also recessed inwardly relative to the side wall 134 of the reservoir 132, as shown in FIG. 4.

In use, the valve stem 26 and the ball valve 22 is inserted into the chamber 32 and the two halves of the central body 30 are brought together. The sphere 112 is inserted into the chamber 114 past the shoulder 118 and when the sphere 112 rests against the flange 104, the pin 92 is inserted through the holes 88 and 90, the resilient prongs 94 and 96 to permit insertion of the points 98 through the hole 90. With the sphere 112 thus retained in the chamber 114 upstream from the pin 92, and the necessary seals and O-rings as illustrated in FIG. 2 being inserted, the first upstream end body 34 and the second downstream end body 36 are mounted as shown, and the bolts are inserted through respective openings 124 in the mounting flanges 126 and 128. The nuts are then tightened on the bolts, and the handle 28 is bolted to the valve stem 26. The valve 10 is then ready to be attached to other components of a liquid handling system, with the tubular extension 78 being connected to the intended source of liquid such as a tank or pipe, and the second downstream end body 36 connected to a pipe or receiver.

The ball valve 22 serves as the flow control valve herein and as illustrated in the drawings, the ball valve 22 is shown in its "open" position to permit liquid to flow therethrough.

When it is desired to reduce or stop the flow of liquid through the ball valve 22, the handle is rotated from the position shown in FIG. 1. Normally, the flow is in a direction from upstream to downstream, shown as right to left as depicted in the drawing, in which instance the flow of liquid enters the opening 106 and causes the sphere 112 to lie in the position against the blocking element 20, for example pin 92, as shown in solid lines in FIGS. 2 and 3. However, instances may occur where backpressure or the like would cause liquid to flow from the downstream to the upstream side of the valve, i.e. left to right in the drawing. The present invention permits the same valve 10 to both control the flow of liquid and to prevent such reverse flow. When such reverse flow occurs, the reverse flow of liquid causes the sphere 112 to move from its normal position in the chamber 114 shown in solid lines to the position shown in broken lines in FIG. 2. In this position, the sphere 112 is moved against the seat 108 of the flange 104 to block the opening 106. The force of the liquid against the sphere 112 seals the opening 106 and ensures that the liquid cannot exit the valve 10 in an upstream direction.

Figure 5:
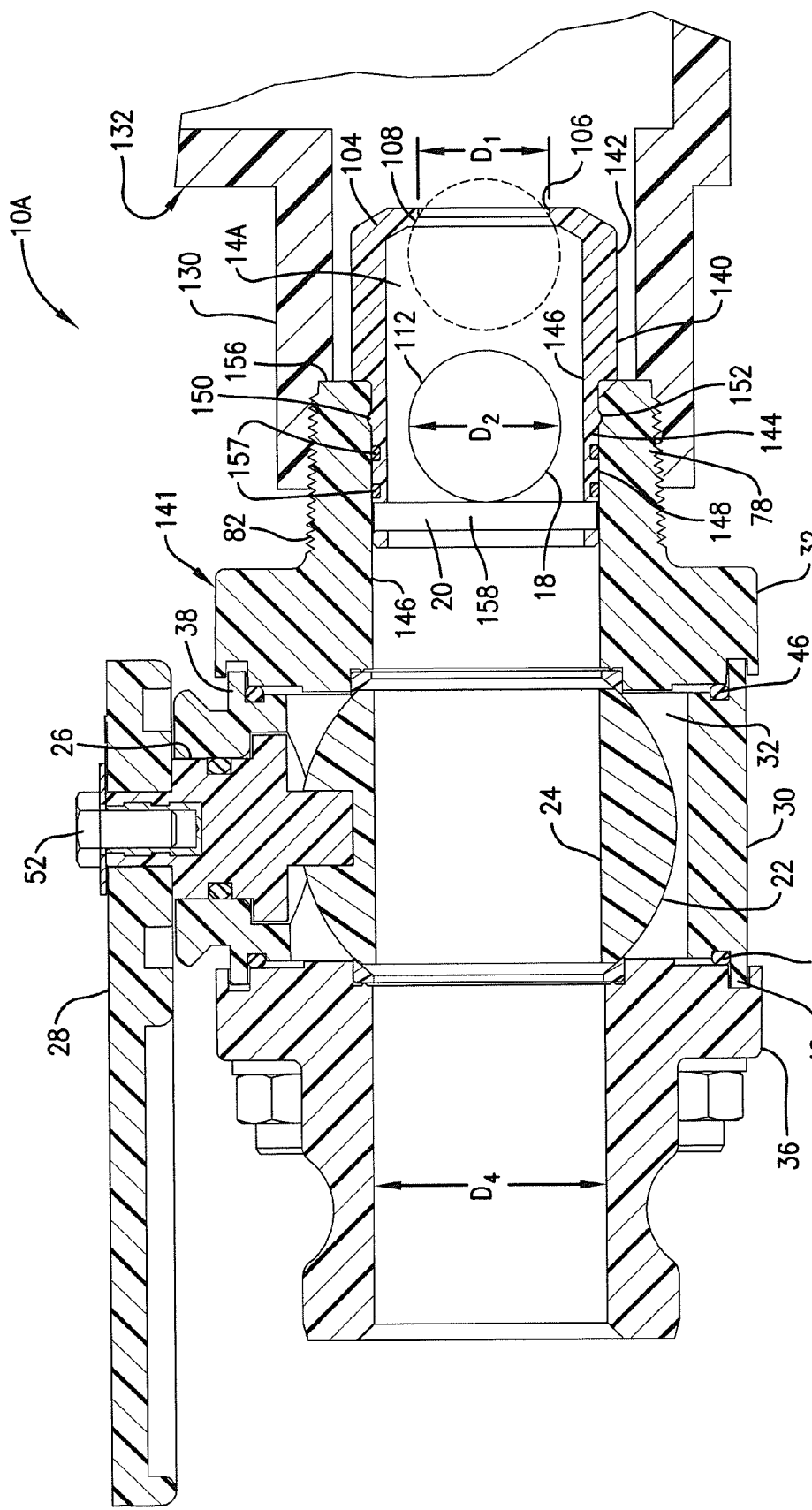
FIG. 5 is a vertical cross-sectional view of an alternate embodiment of a combination flow control valve and reverse flow check valve shown mounted to a tubulation of a reservoir, wherein the reverse flow check valve is provided as an addition mounted to the extension of the housing of the flow control valve component.

FIG. 5 shows an alternative embodiment 10A of the combination flow control valve and reverse flow check valve which is similar to valve 10 as hereinabove described with like numbers used to refer to like features. However, in the alternative embodiment 10A of the combination flow control valve and reverse flow check valve hereof, the reverse flow check valve is provided as a part of an addition 140 inserted into the tubular extension 78 of the first upstream end body 34 of a flow control valve component 141. As may be seen in FIG. 5, the addition 140 is configured as a tubular body 142 most preferably molded of high density polyethylene or other synthetic resin material having neck 144 which is received within the tubular extension 78. In this configuration, the shoulder 114 may be eliminated so that the diameter of the channel 14 across the internal surface 146 of the tubular extension 78 may be substantially the same as the diameter $D_4$ of the remainder of the housing. In order to satisfactorily mount and retain the addition 140 within the tubular extension of the housing 12, the external surface 148 of the neck 144 has a diameter which is substantially the same as that of the internal surface 146, and further the external surface 148 of the neck 144 may be provided with a circumscribing rib 150 which is complementarily configured with a circumscribing groove 152 in the internal surface 146 of the tubular extension 78. The addition 140 may also preferably be provided with a shoulder 154 which is configured to abut with an end surface 156 of the tubular extension 78 when the rib 150 is seated within the groove 152. The external surface 148 of the neck 144 is also preferably provided with circumscribing slots 153 for receiving O-ring seals 157.

Figure 8:
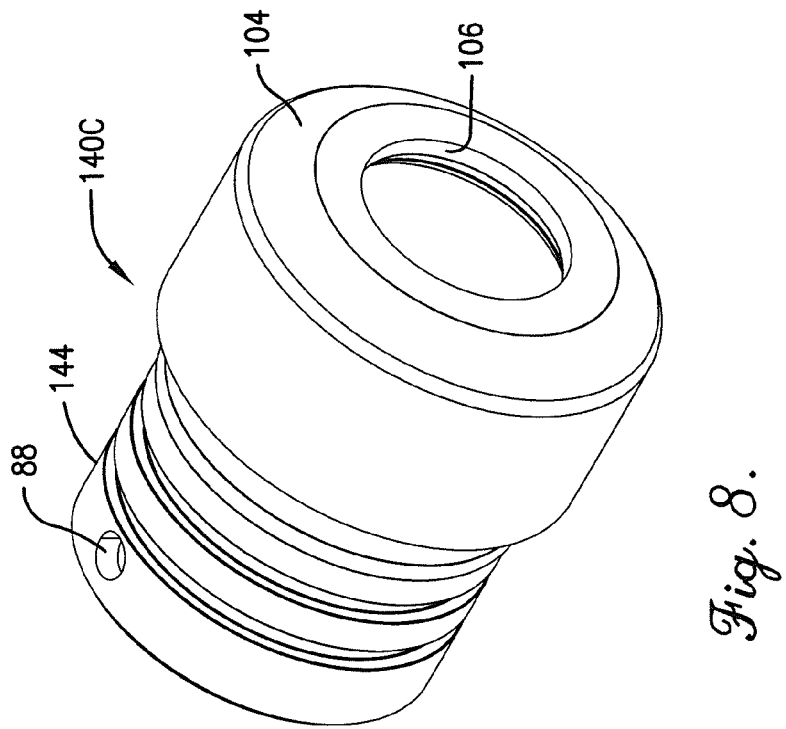
FIG. 8 is a perspective view of an alternate embodiment of the addition for mounting to the housing of a flow control valve as shown in FIG. 5, configured to act as a reverse flow check valve and having a sealing ring received in the normally upstream opening of the addition.

As shown in FIG. 5, the blocking element 20, for example a pin 158, may be inserted through holes 88 and 90 now located in the neck 144. The internal surface 146 of the tubular extension serves to hold the pin 158 in place when the neck 144 is inserted into the tubular extension 78. While the transverse dimension, usually a diameter, of the channel 14A within the addition 140 is somewhat restricted relative to the transverse dimension of the main channel 14 through the first upstream end body 34, the central body 30, and the second downstream end body 36, it is still sufficient to provide substantially uninterrupted flow of liquid around the check element 18, e.g. sphere 112, during desired normal downstream flow as indicated by the sphere 112 shown in solid lines in FIG. 5. However, during a reverse flow event, which is undesired and in a direction generally along the channel 14 from the flow control valve 16 toward the opening 106 and seat 108, the check element 18 is carried in an upstream direction to a sealing position as indicated by the broken lines in FIG. 5 to seal against the flange 104 defining the opening 106 as described with reference to the combination flow control valve and reverse flow check valve 10 described above with respect to FIGS. 2 and 3. The external appearance of the combination flow control valve and reverse flow check valve 10A which includes the addition 140 will be substantially as shown in FIG. 8, and when installed on a tubulation, will appear externally the same as illustrated in FIG. 4 because the addition 140 is entirely located within the tubulation 130. The function and operation of the combination flow control valve and reverse flow check valve 10A which includes the addition 140 will be substantially the same as that described with respect to the combination flow control valve and reverse flow check valve 10 described above with respect to FIGS. 2 and 3. The difference is primarily in that instead of the reverse flow check valve feature being provided as a unitary part of the housing 12 in the first upstream end body 34, the configuration of the addition 140 permits many existing ball or other flow control valves to be retrofit with the addition 140 serving as a reverse flow check valve without increasing the external length of the flow control valve.

Figure 6:
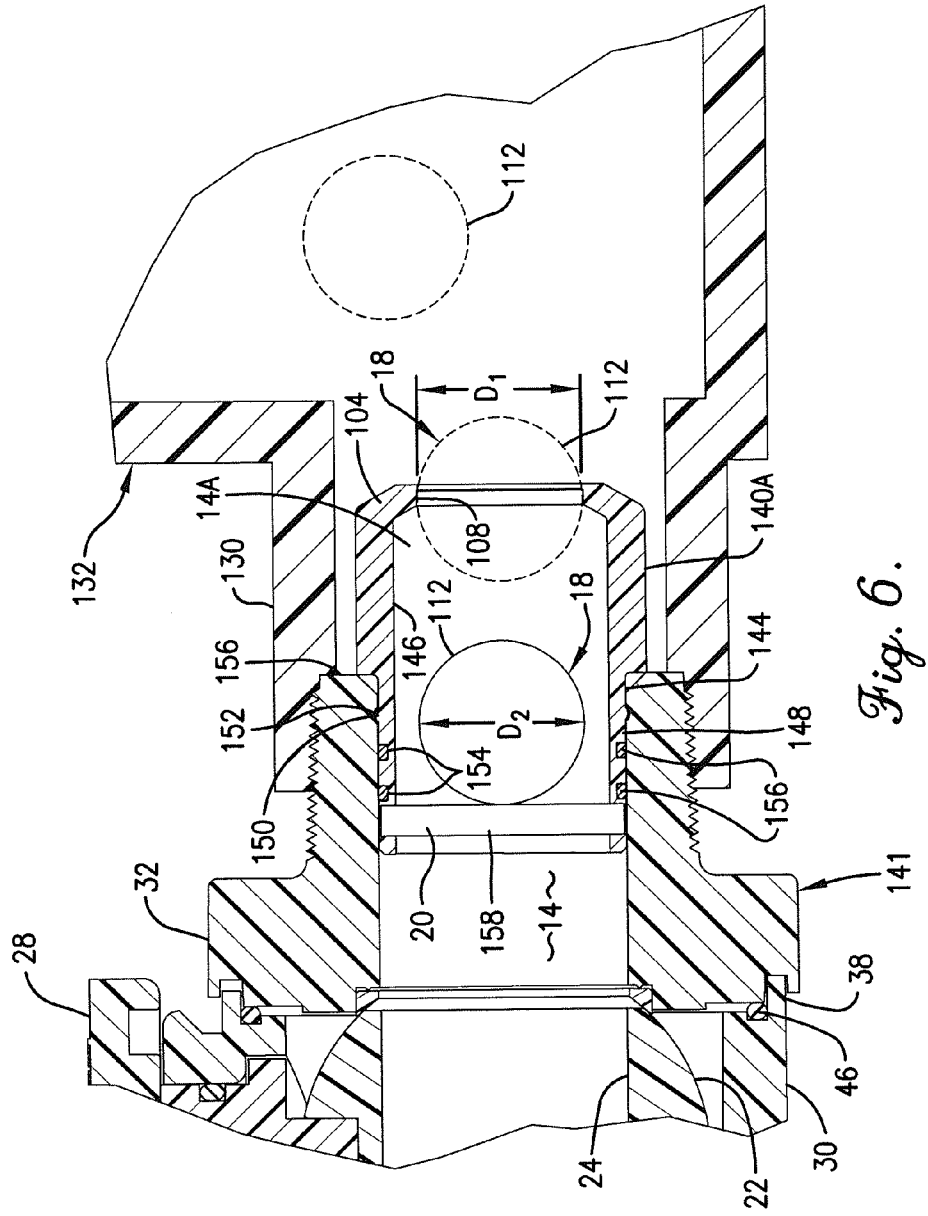
FIG. 6 is a fragmentary cross-sectional view of a combination flow control valve and backflow indicator with some normally downstream portions of the flow control valve shown in FIG. 5 omitted, wherein the normally upstream opening of the addition fluidically connected with the channel of the valve is configured to act as a backflow indicator.

The addition 140A shown in FIG. 6 is in most respects substantially the same as the addition 140 described above in reference to FIG. 5. However, in the addition 140A, the diameter $D_1$ across the seat 108 is increased relative to the diameter $D_2$ of the sphere 112. Here, the diameter across the seat 108 is only slightly less than the diameter of the sphere 112. For example, if a sphere is about 1 inch (about 2.5 cm) in diameter $D_2$, the diameter $D_1$ would preferably be about 0.005 to 0.010 inch less than $D_2$. At least one of the check element 18 and the seat 108 would be sufficiently resilient and deformable that the check element 18 would be ejected from the opening 106 upon the occurrence of a backflow event where pressurization occurred. That is to say, if there was simply some sloshing or other minor reverse flowing of the liquid under normal conditions of movement of the reservoir or the like, the interference between the seat 108 and the check element 112 would be sufficient to retain the check element within the channel 14A. However, if the flow was pressurized, such that the backflow pressure exceeded a desired minimum, for example between 2-20 and more preferably 5-10 psi, then the backflow pressure within the channel 14A would be sufficient to eject the check element 18 past the opening 106 and into the liquid within the reservoir 132. The check element is preferably of HDPE or other similar material with a relatively low specific gravity compared to the that of the liquid contents of the reservoir 132 (e.g., a specific gravity less than 1), such that the check element 18, when ejected, floats to the surface of the liquid within the reservoir 132. When the fill opening is opened, the check element 18 then acts as a backflow indicator, and its presence within the reservoir 132 indicates that the reservoir has been subject to possible contamination and that its contents must be disposed of and the reservoir thoroughly cleaned. As a result, when the addition 140A is mounted to a flow control valve component 141, a combination flow control valve and backflow indicator 10A is provided.

Figure 7:
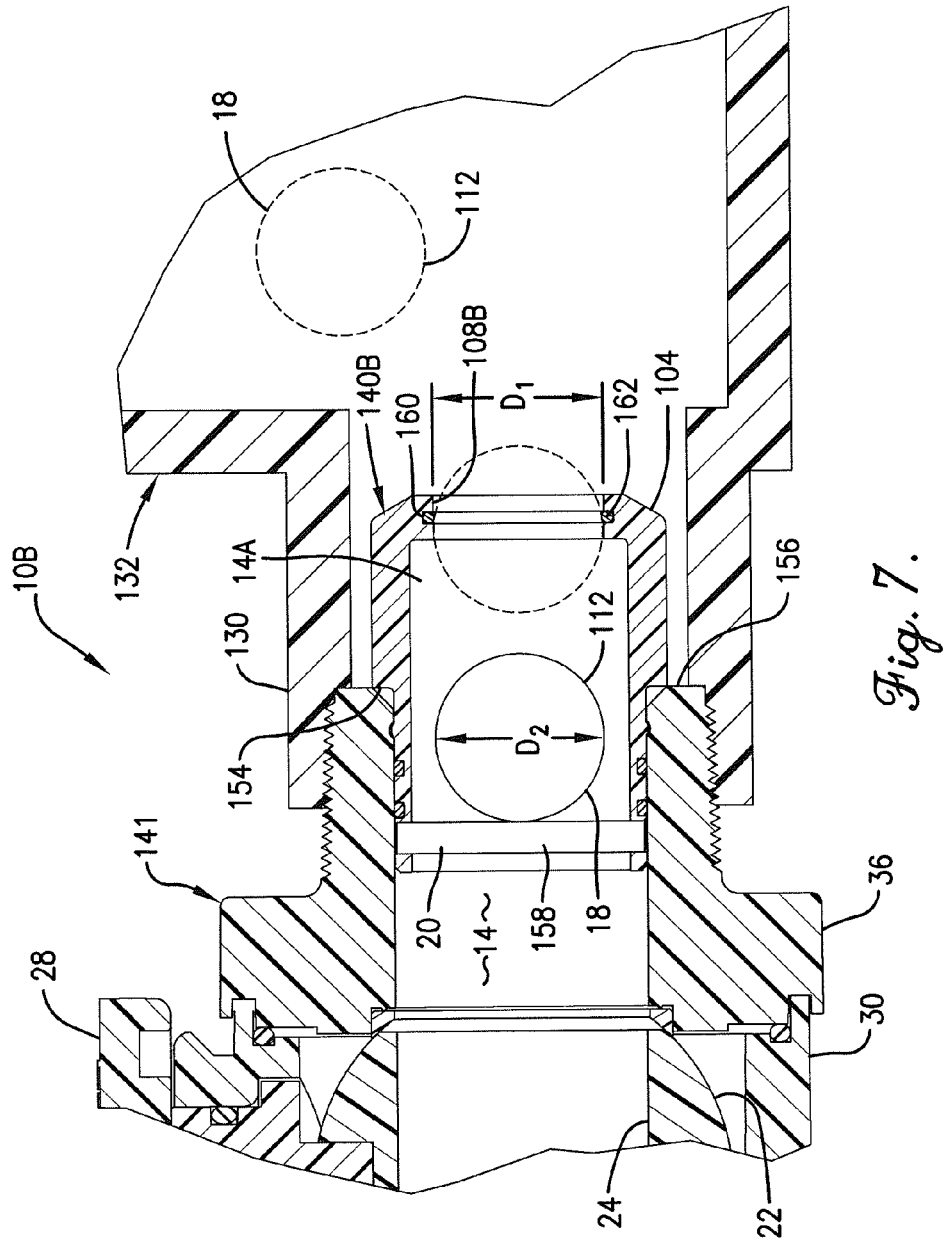
FIG. 7 is a fragmentary cross-sectional view similar to FIG. 6 of the combination flow control valve and backflow indicator provided as an addition, showing an alternate configuration of the normally upstream opening of the addition configured as a backflow indicator and provided with a sealing ring.

FIG. 7 illustrates an addition 140B which is in most respects similar to the addition shown in FIG. 6 and also functions as a backflow indicator, the embodiment of FIG. 7 has a modified opening 106B to provide a combination flow control valve and a backflow indicator 10B. The opening 106B is especially useful in applications where either or both of the check element 18 and the seat 108 are of materials which are of such hardness or density that the check element 18 would not be readily ejected from an opening 106. The opening 106B of FIG. 7 has been modified such that the seat 108B is configured with a circumscribing groove 160 which receives therein a sealing element 162, such as an O-ring. By this modification, the diameter $D_1$ across the seat 108B may be substantially the same, or even slightly greater than the diameter $D_2$ of the check element 18, but the diameter across the sealing element 162 would be slightly less than $D_2$. Taking into consideration the material used in the sealing element 162, which is preferably an elastomeric material such as natural or synthetic rubber or other synthetic resin material, the internal diameter across the installed sealing element 162 would be sufficient to retain the check element 18 under sloshing or other minor reverse flowing of the liquid under normal conditions of movement of the reservoir or the like. However, the sealing element 162 would yield to permit passage of the check element 18 and its ejection from the addition 140B under circumstances of pressurized reverse flow as described in reference to FIG. 6 above.

Figure 9:
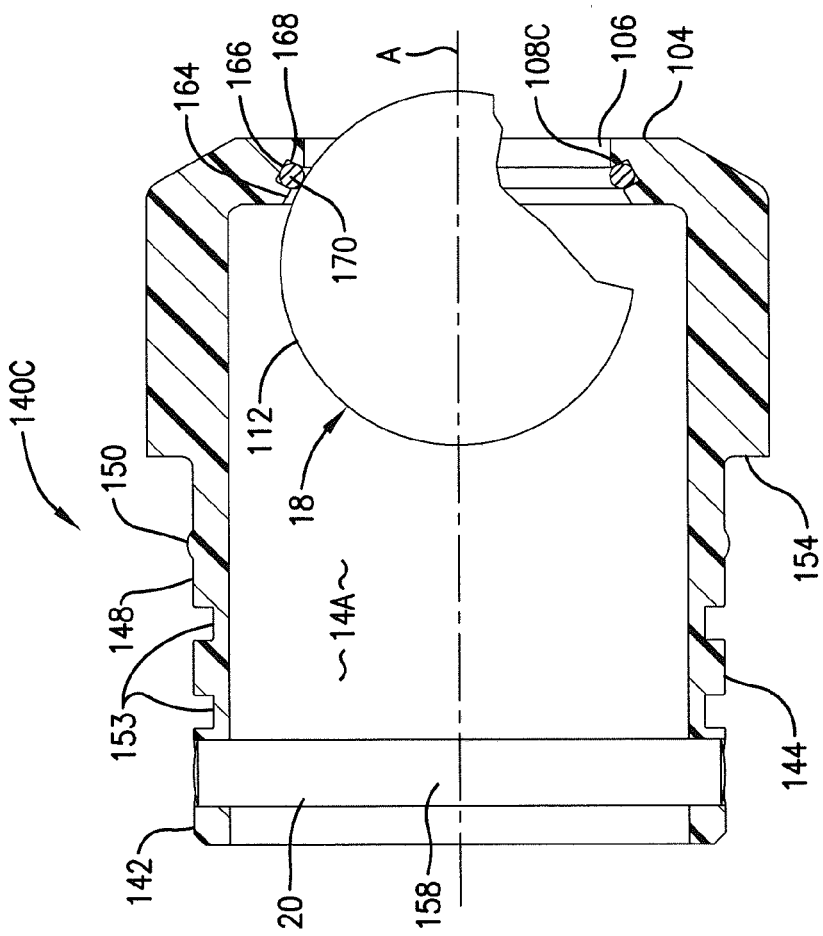
FIG. 9 is a vertical cross-sectional view of the extension shown in FIG. 8, showing the angled orientation of a contact edge of the opening and angled orientation of a groove on the seat for receiving the sealing ring.

FIG. 8 shows a further alternate embodiment of the addition 140C wherein the addition 140C may also be mounted to a flow control valve component 141 to provide a combination flow control valve and reverse flow check valve. FIGS. 8 and 9 show the addition 140C as a separate unit not mounted to a flow control valve component 141 as shown in FIGS. 5, 6 and 7 and like those additions 140, 140A and 140B, may be mounted in other fluid conduits to provide the desired control or indication of backflow. In the embodiment of the addition 140C, the seat 108C is modified in a way that the combination flow control valve and reverse flow check valve 10C retains the check element 18 against the seat 108C during backflow events. Here, the seat 108C has a face 164 which is inclined inwardly toward the channel 14A of the addition 140C at an oblique angle, preferably an acute angle relative to a longitudinally extending central axis A extending through the channel 14A. The face 164 is most preferably at an angle of about 25 to 35 degrees relative to the axis A, and has a circumferentially extending groove 166 with sides 168 extending substantially perpendicular to the face 164. A sealing element 170 of an elastomeric material such as natural or synthetic rubber or other synthetic resin material extends preferably substantially perpendicular from the face 164 of the seat 108C. This orientation is preferably complemental to the external surface of the check element 18, such that upon the occurrence of a backflow event, the check element readily seats against the sealing element 170 in sealing engagement. This embodiment is particularly beneficial when the nature of the liquid contents of the reservoir 132 or the hardness of the check element necessitates a more elastomeric surface against which the check element can seal, or to prolong the life of the seat 108C by providing a replaceable sealing engagement with the check element 18.

The foregoing descriptions of the alternate embodiments for the reverse flow check valve and backflow indicator functions are illustrated and described with reference to the additions 140A, 140B and 140C. However, it is to be understood that the alternate configurations or dimensions of the openings described in reference to the foregoing additions 140A, 140B and 140C may also be incorporated into the tubular extension 78 of the first upstream end body 34 rather than as a separate addition when desired.

The invention claimed is:

1. A combination flow control valve and reverse flow check valve comprising:
   a housing defining a central, fluid conveying channel therethrough, said housing including a substantially circular seat having a first diameter located proximate a desired upstream end of the housing, a tubular extension and an addition including a tubular neck received within said tubular extension, said tubular neck including a pair of diametrically opposed and aligned holes, and further including a blocking element received in said holes of said tubular neck, said blocking element extending transversely across said channel and retained against transverse movement by said tubular extension;

a shiftable valve element positioned within the housing for controlling the flow of liquid through the channel; and a substantially spherical check element having a second diameter which is greater than said first diameter positioned within the housing in an upstream position relative to the shiftable valve element in regard to the desired direction of flow for inhibiting backflow of liquid through the channel, wherein said channel has a chamber having a third diameter, said third diameter being greater than said second diameter.

2. A combination flow control valve and reverse flow check valve as set forth in claim 1, wherein said blocking element is positioned in the channel for preventing excess downstream movement of the check element toward the shiftable valve element.

3. A combination flow control valve and reverse flow check valve as set forth in claim 1, wherein said channel extends longitudinally along an axis from a desired upstream opening end to a desired downstream outlet end, and wherein said blocking element comprises an elongated member extending substantially across said channel in an orientation transverse to the longitudinal axis of the channel, and wherein said blocking element is configured and arranged to permit substantially uninterrupted flow of fluid therepast.

4. A combination flow control valve and reverse flow check valve as set forth in claim 3, wherein said blocking element is removably received in said holes.

5. A combination flow control valve and reverse flow check valve as set forth in claim 1, wherein said channel includes a remainder positioned in a desired direction of flow downstream from said chamber, said remainder having a fourth diameter which is less than said third diameter.

6. A combination flow control valve and reverse flow check valve as set forth in claim 1, wherein said housing is substantially unitary.

7. A combination flow control valve and reverse flow check valve as set forth in claim 1, wherein at least one of said check element and said seat is of a sufficiently resilient material and said first diameter is sufficiently similar to said second diameter such that the check element is retained by said seat within said housing during normal flow of fluid through the valve in the absence of pressurization within the housing but escapes past the seat when pressurization occurs in said housing causing reverse flow of fluid in an upstream direction.

8. A combination flow control valve and reverse flow check valve as set forth in claim 7, wherein said check element has a specific gravity less than 1.

9. A combination flow control valve and reverse flow check valve as set forth in claim 7, wherein said seat includes a circumscribing groove and a sealing element of resilient material received in said groove.

10. A combination flow control valve and reverse flow check valve as set forth in claim 1, wherein said fluid conveying channel has a longitudinal axis and said circular seat has a face which is angled between 25° and 35° relative to said axis.

11. An addition for mounting to a flow control valve having a housing adapted for conveying fluid therethrough and mounting a shiftable valve element for controlling the flow of fluid through the valve, said addition comprising:

a tubular body including an external surface having a circumscribing rim and at least one circumscribing slot, said body further having a fluid conveying channel of a first diameter, a pair of diametrically opposed and aligned holes in said tubular body adjacent a normally downstream end of the tubular body, and a seat axially spaced from the holes at a normally upstream end of the body, said seat having a second diameter which is substantially less than said first diameter;

a substantially spherical check element received in said tubular body for shiftable movement along said channel, said check element having a third diameter which is less than said first diameter and greater than said second diameter; and a blocking element received in said holes and extending diametrically across said channel, said blocking element being sized complemental to said channel of said tubular body for preventing downstream movement of said check element past said blocking element.

12. An addition as set forth in claim 11, wherein said external surface includes a neck having said abutting shoulder which includes said circumscribing rib and said at least one circumscribing slot, said external surface further including a shoulder which extends radially from said neck a greater radial distance than said circumscribing rib.

13. An addition as set forth in claim 11, wherein said seat includes a circumscribing groove and a resilient O-ring received in said groove.

14. An addition as set forth in claim 11, wherein said channel has a central, longitudinally extending axis, and wherein said seat includes a face which is angled between about 25° and 35° relative to said axis.

15. In a reservoir for holding fluids having a tubulation extending therefrom adapted to discharge fluid therefrom, the reservoir comprising a combination flow control valve and reverse flow check valve mounted to said tubulation, said combination flow control and reverse flow check valve including:

a housing having an axially extending fluid conveying channel therein, said housing having a first desired upstream end fluidically coupled to said tubulation and a second desired downstream end, said housing including a substantially circular seat having a first diameter located proximate the first desired upstream end of the housing, a tubular extension and an addition including a tubular neck received within said tubular extension, said tubular neck including a pair of diametrically opposed and aligned holes, and further including a blocking element received in said holes of said tubular neck, said blocking element extending transversely across said channel and retained against transverse movement by said tubular extension;

a shiftable valve element positioned within the housing for controlling the flow of liquid through the channel; and a substantially spherical check element having a second diameter which is greater than said first diameter positioned within the housing in an upstream position relative to the shiftable valve element in regard to the desired direction of flow for inhibiting backflow of liquid through the channel from the desired downstream end toward and into the tubulation, wherein said channel has a chamber having a third diameter, said third diameter being greater than said second diameter.

16. A reservoir as set forth in claim 15, wherein said blocking element is received within the housing and positioned in the channel for preventing excessive downstream movement of the check element toward the shiftable valve element.

17. A reservoir as set forth in claim 16, wherein said channel extends longitudinally along an axis from said first desired upstream opening end to said second desired downstream end, and wherein said blocking element comprises an elongated member extending substantially across said channel in an orientation transverse to the longitudinal axis of the channel, and wherein said blocking element is configured and arranged to permit substantially uninterrupted flow of fluid therepast.

18. A reservoir as set forth in claim 17, wherein said blocking element is removably received in said holes.

19. A reservoir as set forth in claim 15, wherein said channel includes a remainder positioned in a desired direction of flow downstream from said chamber, said remainder having a fourth diameter which is less than said third diameter.

20. A reservoir as set forth in claim 15, wherein said housing is substantially unitary.

21. A reservoir as set forth in claim 15, wherein at least one of said check element and said seat is of a sufficiently resilient material and said first diameter is sufficiently similar to said second diameter such that the check element is retained by said seat within said housing during normal flow of fluid through the valve in the absence of pressurization within the housing but escapes past the seat when pressurization occurs in said housing causing reverse flow of fluid in an upstream direction.

22. A reservoir as set forth in claim 21, wherein said check element has a specific gravity less than 1.

23. A reservoir as set forth in claim 21, wherein said seat includes a circumscribing groove and a sealing element of resilient material received in said groove.

24. A reservoir as set forth in claim 15, wherein said fluid conveying channel has a longitudinal axis and wherein said seat has a face which is angled between 25° and 35° relative to said axis.

25. A method of detecting the occurrence of a backflow event into a reservoir comprising the steps of:
   providing a reservoir including a quantity of liquid, the reservoir having a check valve mounted thereto, the check valve including a housing fluidically connected to said reservoir and a substantially circular seat having a first diameter, and a substantially spherical check element having a second diameter greater than said seat, said check element having a specific gravity less than 1 and being normally positioned with said seat being between said check element and the liquid in the reservoir;
   causing the check element to move past the seat and into the liquid within the reservoir upon the occurrence of a backflow event, whereby the check element may be observed floating at the surface of the liquid within the reservoir.

* * * * *